United States Patent
Pistol et al.

(10) Patent No.: US 11,023,672 B1
(45) Date of Patent: Jun. 1, 2021

(54) DYNAMIC SERVICE INJECTION

(71) Applicant: Amazon Technologies, Inc., Seattle, WA (US)

(72) Inventors: Bogdan Ciprian Pistol, Burnaby (CA); Samuel Edward Creed, Vancouver (CA); Marek Jan Dec, Vancouver (CA); Ulrich Geilmann, Vancouver (CA); Afshin Khashei Varnamkhasti, West Vancouver (CA); Shonn Oleg Lyga, Vancouver (CA); Nick Obradovic, Vancouver (CA); Erik Shadwick, Vancouver (CA); Gurvinder Singh, Burnaby (CA); Ganna Topol, Vancouver (CA); Sheng-Yuan Wang, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/882,716

(22) Filed: Jan. 29, 2018

(51) Int. Cl.
| | |
|---|---|
| *G06F 17/00* | (2019.01) |
| *G06F 40/197* | (2020.01) |
| *G06F 9/451* | (2018.01) |
| *G06F 40/14* | (2020.01) |
| *G06F 40/123* | (2020.01) |
| *H04L 29/08* | (2006.01) |

(52) U.S. Cl.
CPC ............ *G06F 40/197* (2020.01); *G06F 9/451* (2018.02); *G06F 40/123* (2020.01); *G06F 40/14* (2020.01); *H04L 67/02* (2013.01)

(58) Field of Classification Search
CPC ...... G06F 16/955; G06F 40/197; G06F 40/14; G06F 40/123; G06F 9/451; H04L 51/046; H04L 2209/60; H04L 67/02
See application file for complete search history.

(56) References Cited

U.S. PATENT DOCUMENTS

| | | | |
|---|---|---|---|
| 6,564,243 B1* | 5/2003 | Yedidia | ............... H04L 29/06 704/217 |
| 8,856,734 B2 | 10/2014 | Thyagarajan et al. | |
| 2006/0200535 A1* | 9/2006 | Moser | ..................... G06F 9/452 709/217 |
| 2008/0148383 A1* | 6/2008 | Pitchaikani | ............. H04L 67/20 726/12 |
| 2009/0234972 A1* | 9/2009 | Raghu | ................. H04L 67/2804 709/246 |
| 2010/0037150 A1* | 2/2010 | Sawant | ................. G06F 16/986 715/753 |

(Continued)

OTHER PUBLICATIONS

Mozilla Developer Network, "iframe-HTML MDN," copyright 2013, mozilla.org, https://web.archive.org/web/20130818101850/ https://developer.mozilla.org/en-US/docs/Web/HTML/Element/ iframe, pp. 1-6 (Year: 2013).*

*Primary Examiner* — Andrew T McIntosh
(74) *Attorney, Agent, or Firm* — Knobbe Martens Olson & Bear LLP

(57) ABSTRACT

Features are disclosed for injection services that allow a development team to quickly and easily include functionality developed by other teams. The main application server injects functionality into responses. The injected service content may include executable content (e.g., scripts) which may be retrieved from a content distribution network. This provides a framework for integrating various, decoupled features into a single main application.

20 Claims, 6 Drawing Sheets

(56) References Cited

U.S. PATENT DOCUMENTS

| | | | |
|---|---|---|---|
| 2012/0226625 A1* | 9/2012 | Pfeffer | G06Q 50/28 705/341 |
| 2013/0212465 A1* | 8/2013 | Kovatch | G06F 17/227 715/234 |
| 2015/0271121 A1 | 9/2015 | Wells | |

* cited by examiner

DYNAMIC SERVICE INJECTION

BACKGROUND

Users of networked services can spend a majority of their time multitasking between assignments, monitoring execution of a process, handling specific process exceptions, or solving reported issues. The mechanisms used to handle the workload are typically ad-hoc using disparate tools to complete a specific task.

For example when a transportation center user receives a call from a carrier reporting a late truck, the transportation center user may need to identify the identity of the caller, determine the associated load, or search for information about the load in a fulfillment system to confirm the load or information about the load (e.g., destination, specific items within the load, etc.). There can be misunderstandings when communicating identifiers during a given call. The misunderstandings may be caused by possible voice call quality problems, driver accent, mispronunciation, or system inconsistencies. In such instances, the transportation center user may repeatedly try to search for the load using one or more networked services. At the same time, the transportation center user may already be handling by chat or email a different problem requiring different searches and actions in the fulfillment system or other tools.

In addition to the inefficiencies for the transportation center user, when a networked service is accessed, resources of the device requesting the service or providing the service are spent. These service requests may not yield the expected result or provide accurate information about a given task. Over time, these repeated failed attempts can consume substantial network resources.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
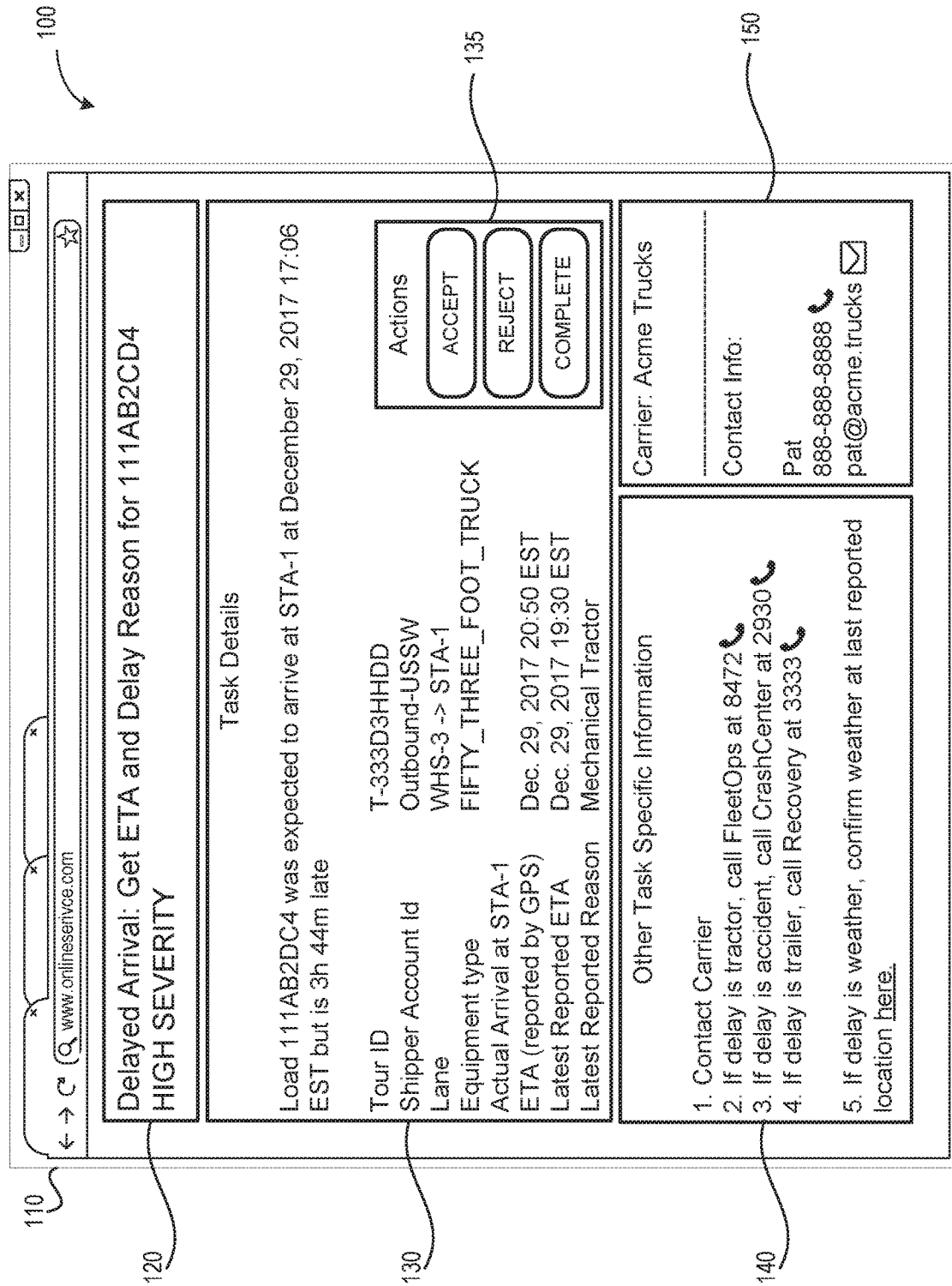
FIG. 1 is a pictorial diagram showing an illustrative user interface including injected service content for presentation on an access device.

Multitasking between tools and doing ad-hoc multi-step searches to identify problem contexts has high operational overhead and does not scale to a typical number of users and transactions in a networked service operation such as an electronic shopping catalog system. The context of the problem being handled and the relevant tool(s) to resolve the problem should be ready to use in close proximity to the work item. For example, when resolving a transportation issue, an interface may display a description of the issue with contact information for the driver or carrier service, side-by-side. Switching between cases/tasks should provide a seamless switch between tools based on the context of the problem. Work items (e.g., cases or tasks handled by a user) may have associated contextual tools depending on their type to streamline the work required to resolve them and to minimize tool multitasking thus improving efficiency. A contextual tool generally refers to a dynamic interface that responds to changes as inputs are received through the interface. For example, if a task is reassigned to a new user, a panel of information including contact information for users may be updated to replace the previous user's contact information with the new user's contact information.

It may be desirable to provide users access to a variety of case and task contextual tools to streamline and lower the time needed to resolve a case or complete a task. The tools may be dynamically injected into an application to relate to the work item being performed. As the number of types of work items increases and the need for specific customization of various tools increases, the overhead of developing the tools may not scale for the team supporting development of a networked service to troubleshoot or resolve the work items. The injection platform described is extensible and allows developing and plugging in new contextual tools by independent teams into different applications which may be used to handle different work items. For example, a contextual tool may be developed that is useful to applications that may be used to handle customer delivery issues as well as applications that may be used to handle supplier delivery issues. One specific example may be a communication tool that detects contact information (e.g., a phone number or email address) and converts the contact information into a control element to initiate communication (e.g., new email message, phone call). Thus a communication contextual tool may be implemented as service content that can be injected into either a customer delivery application or a supplier delivery application. Through injection of service content into an application at runtime, development life-cycles between different teams are decoupled, allowing independent release schedules that enable faster release cycles and lower development overhead.

Contextual tools may be available to all actors interacting with work items and provide a consistent look and feel across work items and their associated contextual tools. An injection platform is described for injecting service content into main applications. The injection platform facilitates reusability and minimizes the maintenance effort required to synchronize contextual tools that are also available on other applications. For example, a service content presenting information about a truck may be used in different contexts such as reporting a late delivery carried by the truck or confirming arrival of the truck at a station. In either context, the truck information service may be developed by a single team and incorporated into services developed by other teams.

FIG. 1 is a pictorial diagram showing an illustrative user interface including injected service content for presentation on an access device. The user interface 100 may be displayed on a communication device such as a desktop computer, laptop computer, tablet computer, touchscreen display, smartphone, etc. The communication device may implement or execute a multi-purpose application for displaying the user interface 100 such as a network browser 110. In some implementations, the communication device may implement or execute a specific application for displaying the user interface 100. The specific application or multi-purpose application may be installed on the communication device and configured to transmit and receive content for the user interface 100.

The content included in the user interface 100 may be provided from multiple sources. For example, a network page can be assembled by injecting, in addition to the main content, different functional areas to form the user interface 100 presented to a user. The user interface 100 may be used for resolving a transportation delay for a particular delivery. The user interface 100 may be defined by a transportation service user team, but include injected content from services developed by other teams such as a communication team, tasking workflow team, or load status reporting team. As shown in FIG. 1, the user interface 100 includes task content 120 as the main content but also service content including load status content 130, communication content 150, and task workflow content 140.

When a user requests the user interface 100 in order to, e.g., resolve a transportation delay or complete another delivery task, the server generating the response may provide main application content from an application developed by the transportation service user team. The main application content may be defined by a template. The template may include specific main application information and references to injected service content. The template may be a network page definition that specifies elements to include on a network page. The template may include a record identifier or dynamically loaded page elements. For example, the server may inject service content developed by other teams. The injection may be based on identifying specific values in the main application content associated with specific service content. Listing 1 provides one example of a template for the user interface 100 shown in FIG. 1.

Listing 1

Delayed Arrival: Get ETA and Delay Reason for [load_id] [task_severity]
```
<script>
// global variables accessible by injected content
var load_id=[load_id];
var task_id=[task_id];
</script>
<% injectable name="loadStatusContent" version="1.4" %>
<% injectable name="communicationContent" version="4.2" %>
<% injectable name="taskWorkflowContent" version="3.1" %>
```

The injected service content may reference an executable script that presents the service specific information. For example, for the user interface 100 for resolving a delay, the communication content 150 may obtain an identifier for the task or specific load that is delayed, and query a communication service to identify the specific contact information for the driver or carrier handling the specific load being assessed. In this way, the user accessing the user interface 100 is presented with accurate and specific information related to the task being performed without switching interfaces, performing additional inquiries, or otherwise consuming resources to perform the task. Listing 2 provides an example of how the communication content 150 may be represented after injection of the communication service content.

Listing 2

Delayed Arrival: Get ETA and Delay Reason for 111AB2CD4
HIGH SEVERITY
```
<script ref="main">
// global variables accessible by injected content
var load_id=111AB2CD4;
var task_id=8888;
</script>
<% injectable name="loadStatusContent" version="1.4" %>
   <iframe>
   <script ref="communication"
   src="http://commservice.com/getContactInfo.js">
      show_task(task_id);
   </script>
   </iframe>
<% injectable name="taskWorkflowContent" version="3.1" %>
```

After injection by the main application server, the communication service content may not include the content that is shown in the communication content 150. Instead, the injected content may reference an executable script that includes a function (show_task) which is called by the injected content such as delivery task network page. This function may initiate a request to the specific application server for the communication service to obtain the content shown in the communication content 150. The function may receive a value (e.g., delivery task identifier) that can be used to identify a specific task to be processed using the main application.

The main application content may execute in a first context in the network browser 110. A context identifies variables or other operational attributes that are accessible. Within a context, a variable may restrict the scope of access by specifying whether other contexts can access the variable and, if so, what type of access is permitted (e.g., read only, read and write, or write only). Service content may execute in a second context with limited access to a set of variables from the first context of the main application content. In a network page, one way to isolate the service content is to present the service content in a frame such as a Hypertext Markup Language inline frame (Iframe). Elements of content may access a specific service to generate the information for display.

The executable scripts may implement a standard interface to further provide communications between injected service content included in the user interface 100. For example, some injected service content may implement a function such as change_carrier(carrier-id). The change_carrier function may be called when the user interface 100 changes the carrier. This change may be initiated by injected service content included in the user interface 100. In such instances, injected service content including carrier information may implement the change_carrier function. The change_carrier function may listen for or subscribe to carrier change events. When the user interface 100 detects a carrier change event (e.g., selection of a new carrier to handle a load) the change_carrier function may be called or a notification issued which can be detected by interested injected service content. In this way, as information changes within injected service content for a first service, the surrounding injected service content for other services may be dynamically updated to maintain data consistency with the updated information.

Figure 2:
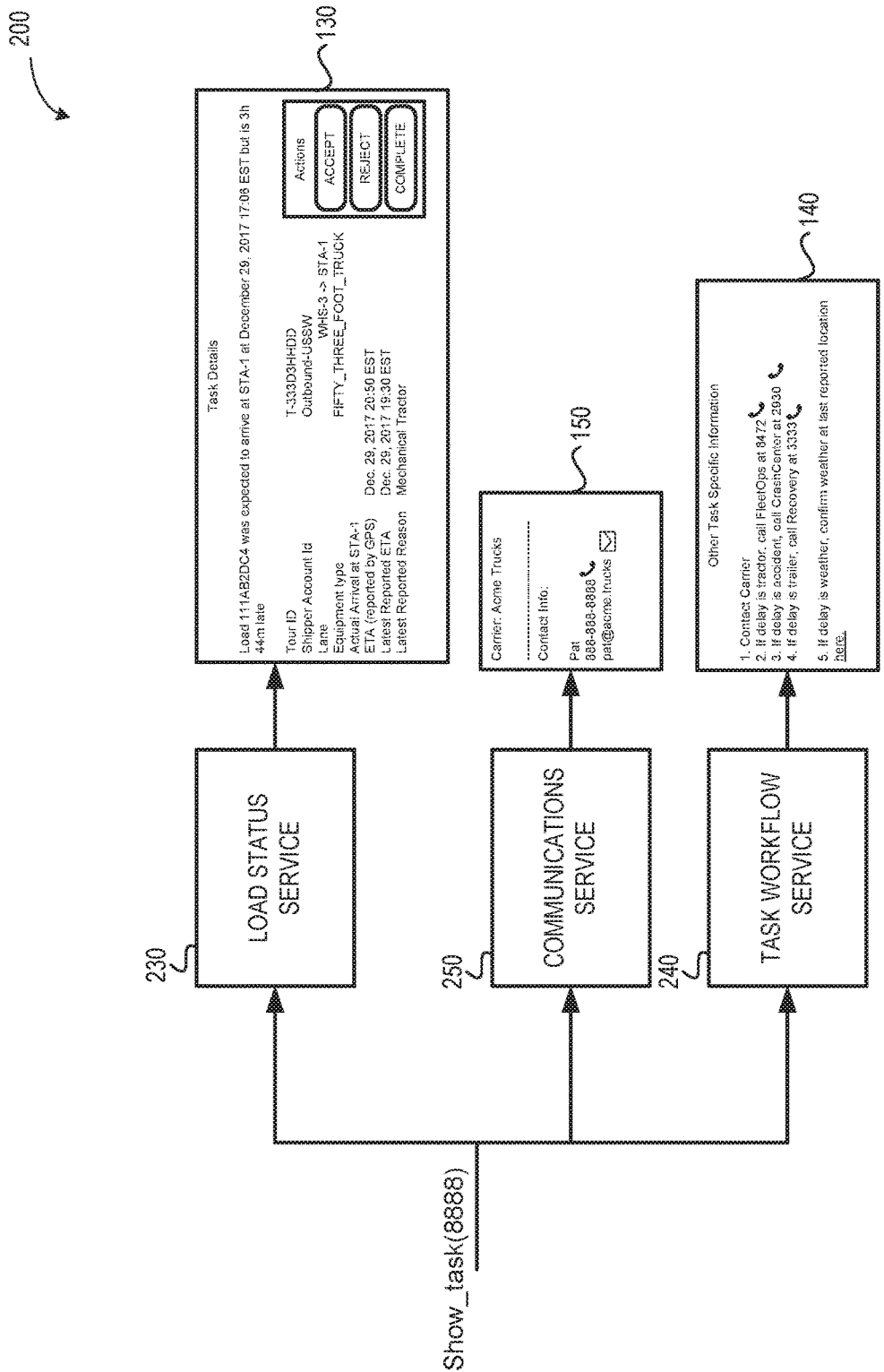
FIG. 2 is a block diagram showing how services can be accessed to provide specific injected service content to the user interface shown in FIG. 1.

FIG. 2 is a block diagram showing how services can be accessed to provide specific injected service content to the user interface shown in FIG. 1. The injected service content associated with each service may provide a function called "show_task." The show_task function may be executed when the user interface 100 is rendered with the specific task identifier. Respective services (e.g., a load status service 230, a communications service 250, or a task workflow service 240) may generate the information for the specific injected server content. The information may be formatted for presentation such as using hypertext markup language or may be provided as structured data (e.g., JAVASCRIPT® object notation objects) for presentation such as via a web page or other network page.

Figure 3:
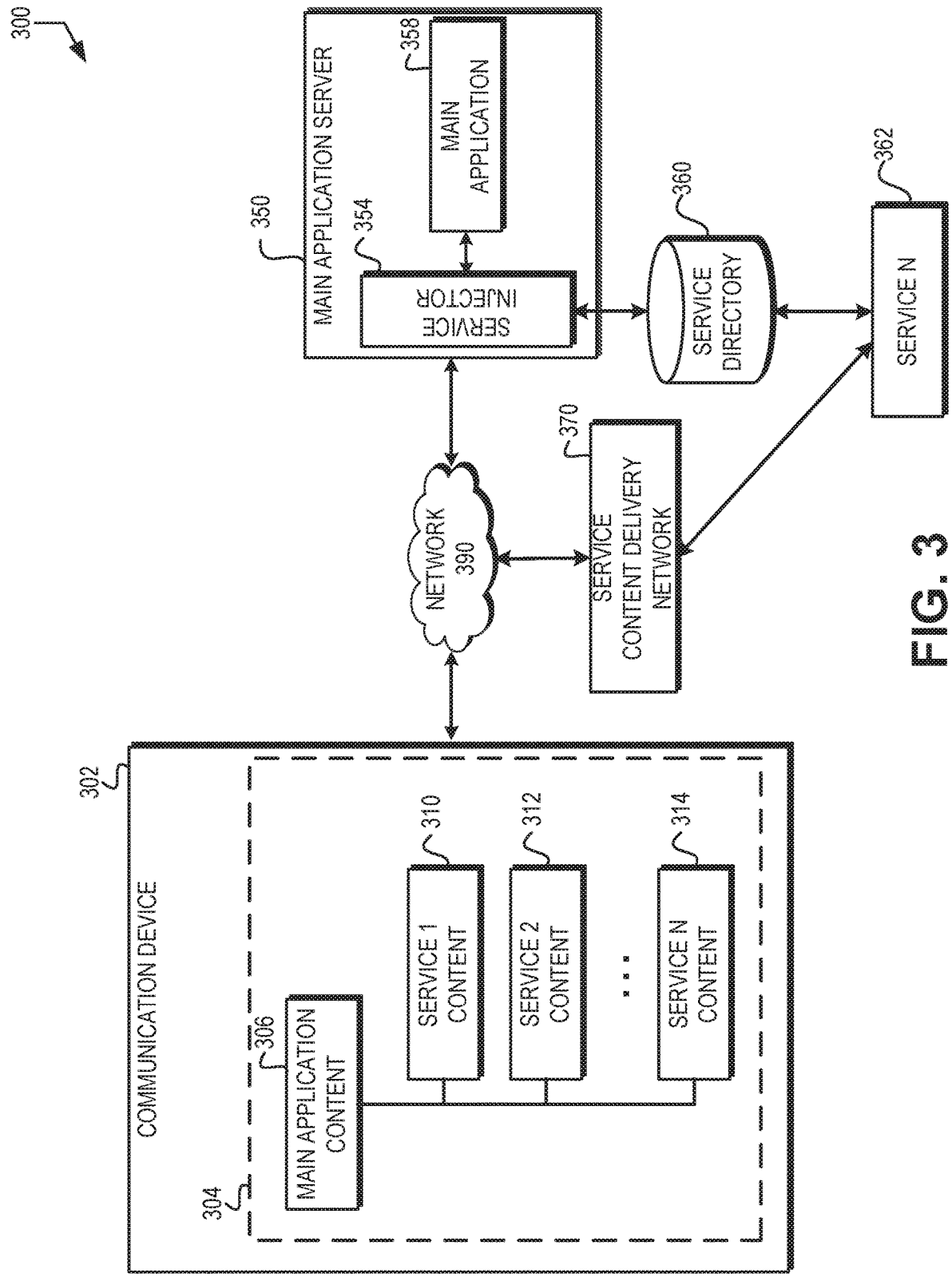
FIG. 3 is a block diagram showing an illustrative environment for injecting service content.

FIG. 3 is a block diagram showing an illustrative environment for injecting service content. A communication device 302 may be used to access a main application server 350 to obtain main application content 306. The communication device 302 may be an electronic communication device configured to transmit machine readable messages via one or more wired or wireless communication protocols. Non-limiting examples of the communication device 302 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other electronic device or appliance. The messages may be formatted according to a standardized protocol such as transmission control protocol/Internet protocol (TCP/IP), hypertext transfer protocol (HTTP), file transfer protocol (FTP), or the like. The transmission may be sent via wireless or hybrid wired-wireless networks represented in FIG. 3 as a network 390.

A user of the communication device 302 may interact with one or more user interfaces to access the main application content 306. An application 304 may be executed by the communication device 302 to present a user interface. The application 304 may be a general purpose network application such as a network browser or a specific application installed on the communication device 302. The user interface may include control elements to receive input or adjust a function of the communication device 302. For example, the communication device 302 may include telephone capabilities. A telephone icon shown on the user interface 100 in FIG. 1 may be a control element to activate the telephone capability of the communication device 302 to initiate a call to the associated telephone number.

The application 304 may present main application content 306 generated by the main application 358. The main application content 306 may also reference injected service content such as service 1 content 310, service 2 content 312, and service n content 314, where n represents the number of different services associated with injected service content that is included within the main application content 306.

A main application server 350 may host the main application 358. One example of the main application server 350 is Apache Tomcat. The main application server 350 may receive requests for the main application content 306 from the communication device 302. The request may include an identifier for the main application 358. The identifier may be specified by the network address to which the communication device 302 directs the request. In some implementations, the identifier may be included in the request such as a parameter or included in a header field or other part of a request message. Based on the identifier, the main application server 350 may direct the request to the main application 358. The main application 358 may identify a content template for presenting the requested information. The main application 358 may generate values to include in the content template such as the task identifier shown in Listing 1. Other elements included in the content template may be injected content provided by other services.

A service injector 354 may receive a response from the main application 358. The response may include a partial document that includes the main application content 306 and references to the injected service content. In some implementations, the references may be referred to as dynamically loaded page elements or page elements. The service injector 354 may monitor the responses to identify those responses that include references to injected service content. For example, in Listing 1, injected service content is shown using a specified markup "<% injectable . . . %>". The service injector 354 may then perform a lookup to replace the markup for the injected service content with specific injected service content or a reference (e.g., uniform resource locator) to the specific injected service content.

The lookup may be based on an attribute included in the specified markup. For example, in Listing 1, the dynamically loaded page element includes a name attribute and a version attribute. A service directory 360 may include the references for active injected service content indexed by name. The service injector 354 may query the service directory 360 using the name to obtain the metadata for the injected service content associated with the name. In some implementations, multiple versions of a service may be provided. For example, if new features are added to a service, the version associated with the new features may be provided a different version number. By using versioning, the main application template can be developed and tested using a known version of injected service content. If the injected service content changes versions, the service injector 354 may obtain a reference to an older version which is still active. If the older version is no longer active because, for example, the older version had a defect, the service injector 354 may not find the requested version of the named injected service content in the service directory 360. In such instances, the service injector 354 may replace the markup with placeholder content or an empty string. In some implementations, the service injector 354 may access a cache of injected service content to object metadata for injected service content lacking an entry in the service director 360.

The service injector 354 may be implemented as a wrapper to the main application 358. In such implementations, execution of the main application 358 may be determined by the service injector 354 wrapper. The service injector 354 wrapper may act as an interface between the web server or application server handling client requests and the main application 358. For example, the service injector 354 wrapper may receive requests and provide them, via an interface, to the main application 358. Responses from the main application 358 are similarly handled by the service injector 354 wrapper. For example, the service injector 354 wrapper may detect a page element referencing injected service content within a response and replace the reference with the injected service content as described.

In some embodiments, the service injector 354 may be implemented as a proxy within the main application server 350 or on another computing device on the network path between the communication device 302 and the main application server 350. In the proxy implementation, the service injector 354 may accept requests for the main application 358 and transmit the requests (as received or in an altered state) to the main application server 350. The service injector 354 may receive responses to the requests from the main application server 350 and transmit the responses (as received or in an altered state) to the communication device 302. For example, the service injector 354 may detect a page element referencing injected service content within a response and replace the reference with the injected service content as described.

The service directory 360 may be maintained in a data store. As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

A service, such as service n 362, may publish the versions of injected service content to the service directory 360. The publication may include associating a name and a version for the injected service content available from the service n 362. The service n 362 may publish the availability after disseminating the injected service content to a service content delivery network 370. As discussed, the injected service content may be dynamically loaded executable scripts. The scripts may be distributed using the service content delivery network 370 to ensure efficient download to the communication device 302. When the script is submitted to the service content delivery network 370, a locator may be provided for the script. The locator may be a uniform resource locator (URL) identifying a network domain associated with the service content delivery network 370. When a communication device attempts to access the locator, the address may resolve to a content delivery server which is geographically closest to the communication device. Because the content delivery server and the communication device are proximately located, less time is needed to transmit the content to the communication device than using a server located in a different part of the world.

Communications from the service n 362 are shown as flowing directly to the service directory 360 and the service content delivery network 370. It will be understood that the network 390 may be used to communicate between these elements.

Figure 4:
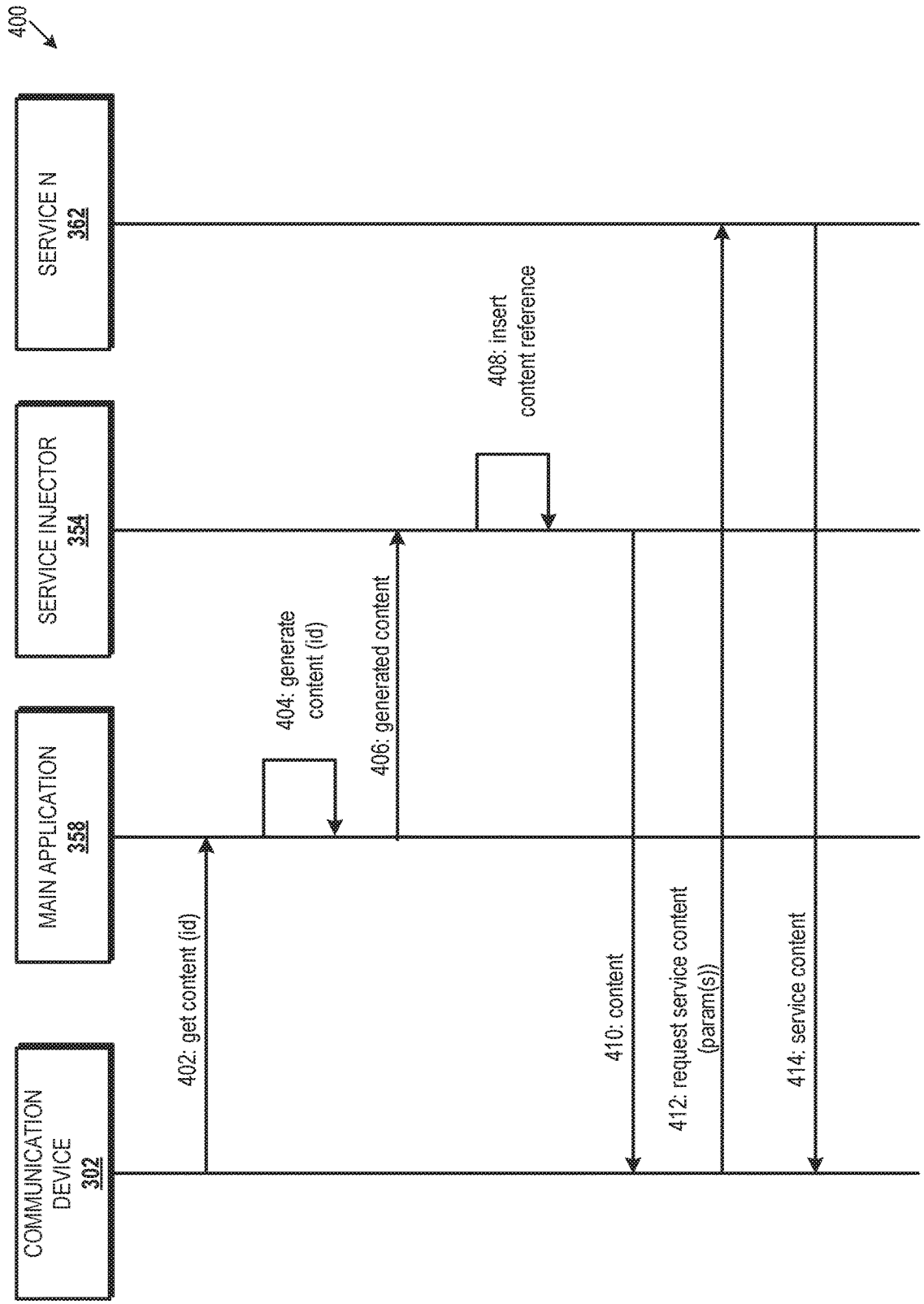
FIG. 4 is a flow diagram showing illustrative messages exchanged to generate content including injected service content.

FIG. 4 is a flow diagram showing illustrative messages exchanged to generate content including an injected service content. The message flow 400 shown in FIG. 4 includes messages exchanged between exemplary entities selected to highlight certain features related to injecting service content elements. It will be understood that fewer or additional entities may be included to achieve a similar result.

A user of the communication device 302 may activate a control element on a user interface that, upon activation, causes transmission of a message 402 to access the main application content. The message 402 may include an identifier for the main application content such as a task identifier or a delivery identifier that can be used by the main application 358 to generate main application content.

The generation of content via message 404 may include identifying a main content template for the requested content. The template may include one or more dynamic values such as task severity, task identifier, or load identifier. To generate the main application content, the main application 358 may create a document that is a copy of the template. In the copy, the dynamic values may be replaced with specific values associated with the requested identifier.

The main application 358 may transmit, via message 406, the generated main application content to the service injector 354. In some implementations, the service injector 354 may be a service of the application server hosting the main application 358. In such instances, the main application content may be transmitted from the main application 358 to the application server. At the application server, the service injector 354 may interrogate the main application content to determine whether the main application content includes a page element associated with injected service content. In some implementations, the service injector 354 may identify main application content including a page element associated with injected service content based on a registry. The registry may include request types that are associated with templates that reference injected service content. In some implementations, the service injector 354 may identify injected service content by scanning the main application content for information identifying injection (e.g., mark up).

Via message 408, the service injector 354 may insert a content reference for the injected service content. The content reference may be a URL for an executable script published via a content delivery network by the service provider.

Via message 410, the main application content including the injected service content reference may be transmitted to the communication device 302. The communication device 302 may then retrieve the executable script or other content included in the injected service content from the content delivery network and execute a request for service content via message 412. The message 412 may include one or more parameters obtained from the main application context. The message 412 may be transmitted to the service n 362. The service n 362 may implement an asynchronous JAVASCRIPT® and XML interface for receiving and processing service content requests. Message 414 may provide formatted service content (e.g., HTML) or representations of the data needed to generate a display of the service content such as JAVASCRIPT® object notation objects. The communication device 302 may render the main application content in the location specified by the main application template.

The communication device 302 may request content as part of a session. A session generally refers to a series of communications between two or more devices or servers. A session may be associated with a session identifier. The session identifier may be included in messages exchanged to allow the session participants to associate specific messages with specific transactions. In this way, a server can concurrently provide injected service content for multiple communication devices by associating devices with a unique session identifier.

Figure 5:
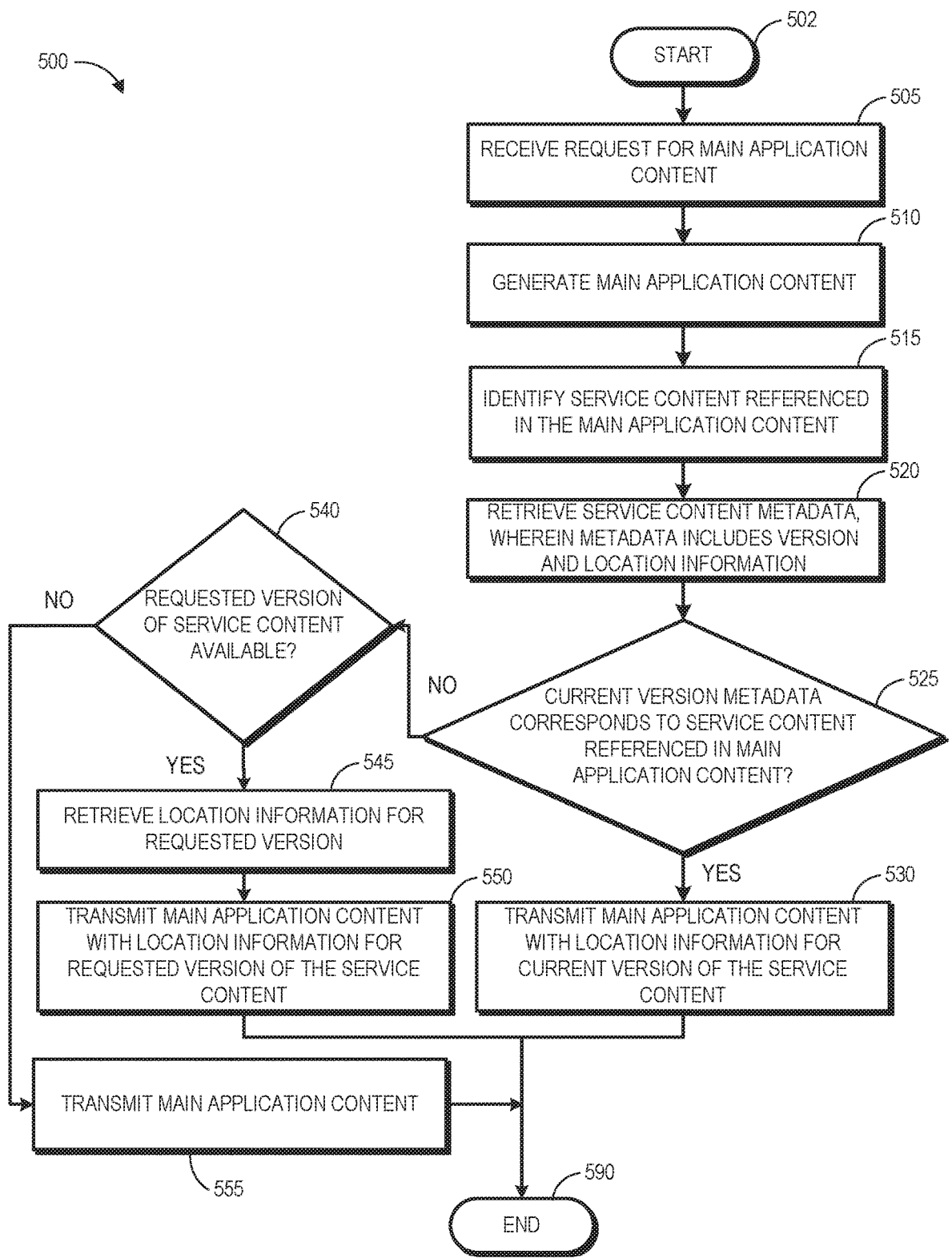
FIG. 5 is a flow diagram showing an illustrative method of generating main application content including injected service content.

FIG. 5 is a flow diagram showing an illustrative method of generating main application content including injected service content. The method 500 may be implemented in whole or in part by the devices described such as by the main application server 350. The method 500 illustrates how a request for main application content including injected service content may be processed. For example, the main application content may include a dynamically loaded page element. Before transmitting the response to a requesting device, the dynamically loaded page element may be replaced by injected service content.

The method 500 begins at block 502. The method 500 assumes that a main application content template (see, e.g., Listing 1) is accessible. The method 500 also assumes that a service directory such as the service directory 360 is accessible.

At block 505, the main application server 350 may receive a request for main application content. For example, the main application content may be a delivery delay resolution network page. The request may include an identifier or other values used by the main application to generate the main application content.

At block 510, the main application of the main application server 350 may generate the main application content. Generating the main application content may include retrieving information from one or more data stores related to the main application. As discussed, the final user interface presented may include injected service content associated with other service providers. The main application content may include markup language or other display instructions that determine how the information may be presented on a user interface.

A template may be identified for generating the main application content. One example of a template is shown in Listing 1. The template may include static elements such as text or images. The template may include dynamic values that are filled when the main application content is requested. Generating the main application content may include creating a document that is a copy of the template. Then, the dynamic values are replaced with actual values. For example, Listing 1 includes a dynamic value for the delivery identifier ("load_id"). A dynamic value may be identified using markup or annotations. As shown in Listing 1, a dynamic value is included in square brackets (e.g., [ and ]). The main application may identify the dynamic value included by scanning for the markup or annotations.

The main application may then transmit the copy of the template including the replaced dynamic values for transmission to the communication device that requested the main application content. The copy may be transmitted through the main application server 350 which may be configured with a service injector. The service injector may monitor all or portions of the response messages scheduled for transmission to communication device. The detection may be based on analysis of the contents of a response message. For example, markup or other annotations may be used to indicate injected service content. The service injector may scan a response message for the markup or annotations to identify those messages with a page element referencing the injected service content. In some implementations, the detection may be based on header information for the response message. For example, a hypertext transport protocol response may include the requested URL or other header field in the response. The requested URL may be associated with injected service content such as through a registry. The service injector may compare the URL or other header field value in the response with a registry of URLs or values associated with dynamically loaded page elements or injected service content to identify those responses associated with injected service content. In some implementations, the detection may be based on JAVASCRIPT® notation included in the response or a database of content registered as including injected service content.

When the service injector detects injected service content, the service injector may, at block 515 identify details about the injected service content as referenced by the page element included in the main application content. The details may be included in the annotation or markup identifying the page element for the injected service content. For example, attributes such as name or version may be included in a tag associated with the injected service content. Table 1 provides a summary of example attributes that may be included in a page element referencing injected service content.

TABLE 1

| Example Attribute | Example Behavior | Required? |
| --- | --- | --- |
| Name | Specify the name of the injected service content | Yes |
| Version | Specify particular version of injected service content to inject | No, default to latest version |
| Strict | Yes: Only inject if specified version is available<br>Major: Only inject if major version ID for current version matches major version ID of specified version.<br>No: Will accept a later versions if specified version is unavailable | No, default to "No" |
| Customer_Id | Identifier for the main application service. May be used by the injected service provider for authorizing, monitoring, and metering service usage | No |
| Region | Identifier for region(s) where the injected service content can be served | No |
| Deployment_Stage | Identifier for deployment environments into which the injected service content can be served (e.g., PROD, DEV, BETA, etc.) | No |

At block 520, the service injector may retrieve service content metadata from a service directory. The service injector may query the service directory using at least a portion of the details obtained from the main application content such as the name or version. In response to the query, the service injector may receive information about the injected service content such as descriptive text, current version information indicating the most recent version of the service, or location information (e.g., URL) for the queried service. The metadata may be published in the service directory by the provider of the service.

At block 525, the service injector may determine whether the metadata for the current version of the injected service content corresponds to the injected service content referenced by the page element in the main application content. The determination at block 525 can ensure that the injected service content provides an expected behavior that the main application service provider previously tested. For example, the tasking service team may develop a main application content that injects communication service content. At the time of development, the template for the main application content may include version 1.3 of the communication service content. The communication team may continue development on the communication service content, releasing subsequent versions and publishing metadata for the new versions in the service directory. The tasking service team may not have the opportunity to confirm that the current version provides an expected service level and as such, can specify that only the specified version may be injected (see, e.g., Table 1 attribute "strict").

Correspondence for a version may be configurable. For example, the system may identify versions using major and minor version identifiers. For example, a version identifier "1.3" may specify major version "1" and minor version "3." Correspondence may be based on a match between major versions. In some implementations, the minor versions may be ignored for correspondence. In some implementations, if the difference between minor versions is less than a threshold amount, the versions may correspond. In some implementations, correspondence may require all portions of the version identifier to match. The configuration may be provided on a system-wide basis using an application service configuration. In some implementations, the correspondence may be specified for injected service content elements such as using markup or annotations.

If the determination at block 525 is affirmative, then the current version indicated by the metadata corresponds to the version specified for injection in the main application content. At block 530, the main application server transmits the main application content including specific references to the injected service content to the communication device. The service injector may replace the markup or annotation for the page element associated with the injected service content with specific references for the injected service content. One example of a specific reference is the location information for the injected service content that is obtained from the metadata. Listing 2 above provides one example of a document with one page element replaced. Assuming all page elements included in the main application content have been replaced, the method 500 ends at block 590. If the main application content includes multiple page elements, blocks 525, 520, and 525 may be repeated for the page elements.

Returning to block 525, if the current version of the injected service content does not correspond to the specified version from the main application content, at block 540, the service injector may determine whether the requested version of the injected service content is available. The determination may be based on the metadata retrieved at block 520. In some implementations, the service injector may transmit an additional query to the service directory for the requested version.

If the determination at block 525 is negative, the requested version may no longer exist. In such instances, at block 555, the main application service may transmit the main application content without the injected service content. The service injector may remove the markup or annotations for the injected service content that was unable to be included. In some implementations, the service injector may include a comment or other information that will not be displayed on the user interface indicating that the injected service content was not injected. This information may be useful for debugging purposes to the main application development team. As above, assuming all page elements have been replaced, the method 500 ends at block 590.

Returning to block 540, if the requested version is available, at block 545, the service injector may retrieve the location information for the requested version. The location information may be retrieved from the metadata for the injected service content.

At block 550, the main application server may transmit the main application content including specific references to the injected service content to the communication device. The service injector may replace the markup or annotation for the page element associated with injected service content with specific references for the requested version of the injected service content. One example of a specific reference is the location information for the injected service content that is obtained from the metadata. Listing 2 above provides one example of a document with one injected service content element replaced. Assuming all page elements have been replaced, the method 500 ends at block 590. If the main application content includes multiple page elements, blocks 525, 520, and 525 may be repeated for the injected service content elements.

In some implementations of the method 500, if a requested version of the service content is not available, the service injector may implement a cache for the metadata for injected service content. The cache may be a specially architected memory managed by rules which indicate how long service information may be cached for, which requests the cache may be used for (e.g., users, communication devices, request domains, etc.), and the like. In such implementations, the service injector may query the cached metadata for the injected service content. If the cache includes an entry associated with the injected service content, the service injector may include the cached location information in the main application content transmitted to the communication device.

Figure 6:
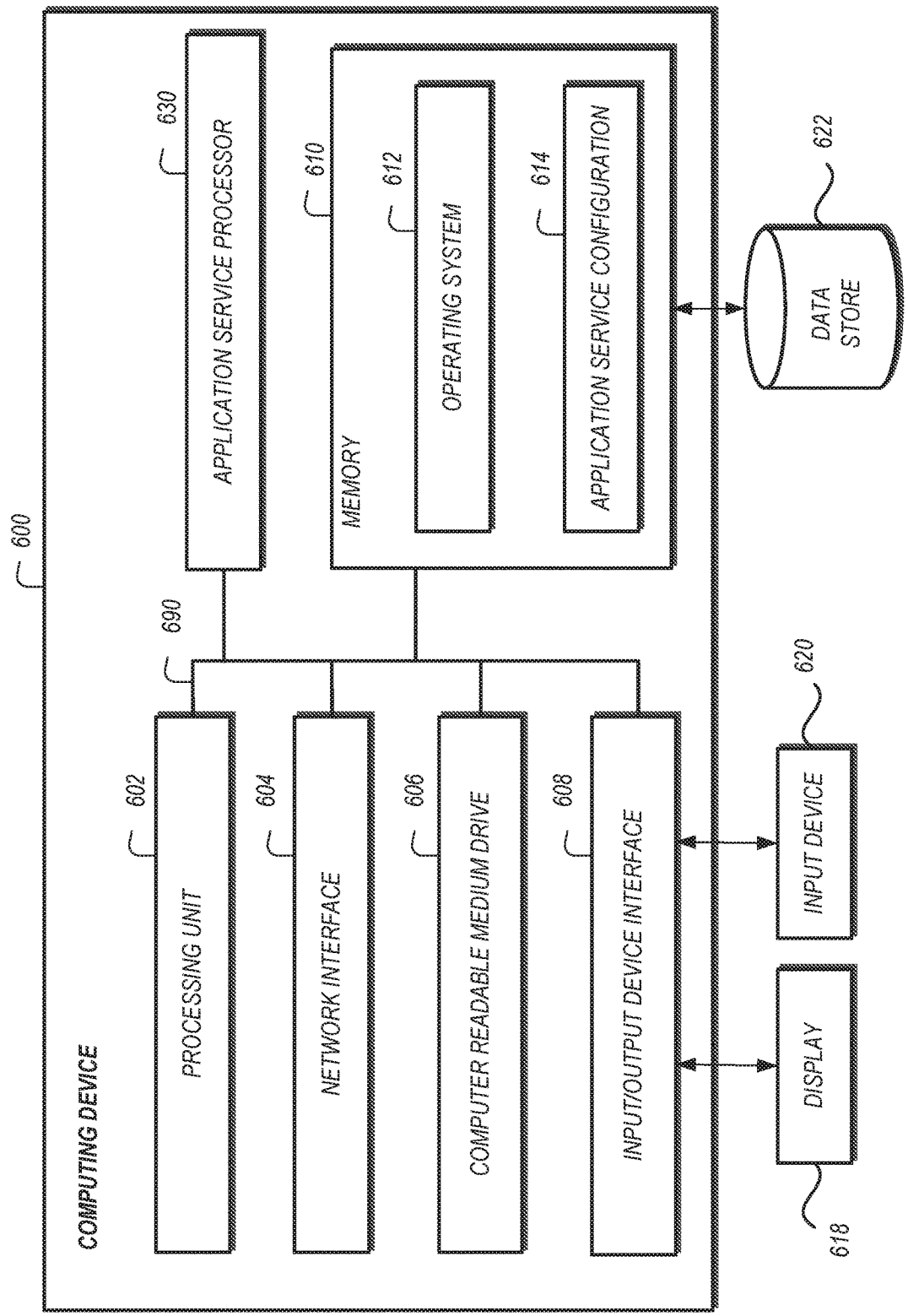
FIG. 6 is a block diagram of an illustrative computing device that may implement one or more of the features described.

FIG. 6 is a block diagram of an illustrative computing device that may implement one or more of the features described. The computing device 600 may implement the methods, interfaces, or messaging shown in FIG. 1, 4, or 5. The computing device 600 can be a server or other computing device, and can include a processing unit 602, an application service processor 630, a network interface 604, a computer readable medium drive 606, an input/output device interface 608, and a memory 610. The network interface 604 can provide connectivity to one or more networks or computing systems. The processing unit 602 can receive information and instructions from other computing systems or services via the network interface 604. The network interface 604 can also store data directly to memory 610. The processing unit 602 can communicate to and from memory 610 and output information to an optional display 618 via the input/output device interface 608. The input/output device interface 608 can also accept input from the optional input device 620, such as a keyboard, mouse, digital pen, microphone, mass storage device, etc.

The memory 610 contains computer program instructions that the processing unit 602 executes in order to implement one or more embodiments. The memory 610 may include RAM, ROM, and/or other persistent, non-transitory computer readable media. The memory 610 can store an operating system 612 that provides computer program instructions for use by the processing unit 602 or other elements included in the computing device in the general administration and operation of the computing device 600. The memory 610 can further include computer program instructions and other information for implementing aspects of the present disclosure.

For example, in one embodiment, the memory 610 includes an application service configuration 614. The application service configuration 614 may include the thresholds, authentication information (e.g., encryption keys, tokens, device identifiers etc.), service directory network addresses, or other predetermined or configurable values described above. The application service configuration 614 may store specific values for a given configuration. The application service configuration 614 may, in some implementations, store information for obtaining values for a given configuration element. For example, a network service for providing rules to identify injectable service content may be specified as a network location (e.g., uniform resource locator (URL) for the service) in conjunction with username and password information to access the network location to obtain the rules or submit documents for injectable service content analysis. The application service configuration 614 may be used by the application service processor 630 to implement one or more of the aspects described herein. In some implementations, the application service processor 630 may include specific computer executable instructions that cause the computing device 600 to perform one or more of the content injection features described.

The memory 610 may also include or communicate with one or more auxiliary data stores, such as data store 622. The data store 622 may electronically store data regarding the main application, templates, a mapping of templates to URLs or other access identifiers, and the like.

The elements included in the computing device 600 may be coupled by a bus 690. The bus 690 may be a data bus, communication bus, or other bus mechanism to enable the various components of the computing device 600 to exchange information.

In some embodiments, the computing device 600 may include additional or fewer components than are shown in FIG. 6. For example, a computing device 600 may include more than one processing unit 602 and computer readable medium drive 606. In another example, the computing device 600 may not be coupled to the display 618 or the input device 620. In some embodiments, two or more computing devices 600 may together form a computer system for executing features of the present disclosure.

The features described provide several non-limiting advantages. Because the injected content is referenced by a main application, the development life-cycles and ownership of the main application and any injected service content are decoupled. This enables more agile development. For example, product development may be streamlined to focus on smaller tasks which can be injected to create more robust functionality. Improved separation of concerns the injected service content elements may conform to an interface contract definition to allow dynamic interaction between widgets with an enforced versioned interface contract. In addition to the contract, by injecting the service content within specific execution contexts provides isolation levels that it minimally affects the rendered content (e.g., network page) in the event of errors or styling issues.

The features may further expedite the provisioning of the service content by referencing scripts to dynamically retrieve and render the service content. Content distribution networks may be used to serve injected presentational content including the HTML, content templates, or executable scripts.

An injected content element may directly communicate with a respective service server. The communications may include AJAX requests. To ensure security of the application including the AJAX communications, the service back-end servers may share a network domain with the main application server. In this way, cross origin request policies. To enhance security further, authentication and authorization may be applied to the servers providing injected services or main application service. This can be achieved by configuring services to use specific authentication and authorization packages to protect the services. The packages may have a uniform configuration (e.g., authorization protocol, default blacklist policy, etc.). For example, in the case of an undefined request to a service, the default authorization response may be to deny the request by requiring specific authorization configuration for service requests.

Some implementations may include cookie based authentication. A cookie generally refers to a verifiable token which is automatically sent with every HTTP request to the same domain name. Because the services may be located within the same network domain, authentication an authorization for the main application service will propagate to any injected service.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An content injection device can be or include a microprocessor, but in the alternative, the content injection device can be or include a controller, microcontroller, or state machine, combinations of the same, or the like configured to authenticate and authorize remote access for delivery of an item. A content injection device can include electrical circuitry configured to process computer-executable instructions. Although described herein primarily with respect to digital technology, a content injection device may also include primarily analog components. For example, some or all of the access control algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a content injection device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the content injection device such that the content injection device can read information from, and write information to, the storage medium. In the alternative, the storage medium can be integral to the content injection device. The content injection device and the storage medium can reside in an application specific integrated circuit (ASIC). The ASIC can reside in an access device or other content injection device. In the alternative, the content injection device and the storage medium can reside as discrete components in an access device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A user interface may be implemented in whole or in part using technologies such as hyper-text mark-up language (HTML), ADOBE® FLASH®, JAVA®, MICROSOFT® .NET®, network services, and rich site summary (RSS). In some implementations, a user interface may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer-implemented method comprising:
    under control of one or more processors,
        storing a web page definition for a delivery task web page, the web page definition comprising:
            a main content page element,
            a dynamic delivery identifier for the delivery task web page, and
            a carrier content page element including:
                a service content identifier for an executable script, and
                a service content version for the executable script;
        receiving, from a first communication device, a request for the delivery task web page;
        in response to the request;
            assigning a value to the dynamic delivery identifier, and
            generating, based at least in part on the web page definition, a hypertext markup language document including the main content page element and the carrier content page element, wherein the main content page element is to be executed in a first execution context;

detecting the carrier content page element within the hypertext markup language document;

receiving, from a service directory, metadata for the carrier content page element based at least in part on the service content identifier, wherein the metadata includes: (i) a version identifier for the carrier content page element, and (ii) a network address for a version of the carrier content page element associated with the version identifier;

determining that the version identifier included in the metadata corresponds to the service content version included in the carrier content page element detected within the hypertext markup language document;

replacing the carrier content page element in the hypertext markup language document with the executable script that is identified by the service content identifier, wherein the executable script references the network address for the version of the carrier content page element and the value assigned to the dynamic delivery identifier, and wherein the executable script is to be executed in a second execution context and has limited access to the main content executed in the first execution context; and transmitting, to the first communication device, the hypertext markup language document in which the carrier content page element has been replaced with the executable script.

2. The computer-implemented method of claim 1, further comprising:

transmitting, to a content delivery network server associated with a plurality of content servers, the executable script; and updating metadata for the carrier content page element to include an address of the content delivery network server.

3. The computer-implemented method of claim 1, wherein the web page definition further includes a delivery task identifier, wherein the executable script includes instructions to reference the delivery identifier for the delivery task web page, and wherein the hypertext markup language document in which the carrier content page element has been replaced with the executable script, upon loading at the first communication device, associates the value assigned to the dynamic delivery identifier with the first execution context and the delivery task identifier with the second execution context.

4. A computer-implemented method comprising:
under control of one or more processors,
generating, based at least in part on a page definition, a network page including main content and injected service content, wherein the page definition comprises:
a dynamic first record identifier for the network page, and
a first service page element including:
a first injected service content identifier for the injected service content, and
a first injected service content version for the injected service content, and
wherein generating the network page based at least in part on the page definition comprises:
assigning a value to the dynamic first record identifier;

detecting the first service page element within the network page; and replacing the first service page element with the injected service content identified by the first injected service content identifier, wherein the injected service content references a network address for the first service page element and the value assigned to the dynamic first record identifier for the network page, wherein the network page, upon loading, executes the main content in a first execution context and the injected service content in a second execution context, and wherein the injected service content executed in the second execution context has limited access to the main content executed in the first execution context.

5. The computer-implemented method of claim 4, further comprising:

receiving, from a service directory, metadata for the first service page element based at least in part on the first injected service content identifier, wherein the metadata includes: (i) a first version identifier for the first service page element, and (ii) a first network address for a first version of the first service page element associated with the first version identifier; and determining that the first version identifier corresponds to the first injected service content version.

6. The computer-implemented method of claim 4 wherein:

the page definition further comprises a second service page element including:
a second injected service content identifier, and
a second injected service content version, and generating the network page based at least in part on the page definition further comprises:
receiving, from a service directory, metadata for the second service page element based at least in part on the second injected service content identifier, wherein the metadata includes: (i) a first version identifier for the second service page element, and (ii) a first network address for a first version of the second service page element associated with the first version identifier;

determining that the first version identifier does not correspond to the second injected service content version;

retrieving, from a metadata cache, cached metadata for the second service page element, the cached metadata including: (i) a second version identifier for the second service page element, and (ii) a first network address for a second version of the second service page element associated with the second version identifier; and replacing the second service page element with content including the first network address for the second version of the second service page element associated with the second version identifier.

7. The computer-implemented method of claim 4, wherein the network page is generated by an application server, and wherein the application server and a computing device identified by the network address for the first service page element are located within a same network domain.

8. The computer-implemented method of claim 4, wherein the injected service content is included within a frame of the network page so as to limit access by the injected service content executed in the second context to the main content executed in the first execution context.

9. The computer-implemented method of claim 4, wherein access, by the injected service content executed in the second execution context to the main content executed in the first execution context, is limited to a variable from the main content executed in the first execution context.

10. The computer-implemented method of claim 4, further comprising:
  transmitting, to a content delivery network server associated with a plurality of content servers, the injected service content; and
  updating metadata for the first service page element to include an address of the content delivery network server.

11. The computer-implemented method of claim 4, further comprising:
  receiving, from a communication device, a request for a record; and
  generating the network page in response to the request for the record, wherein the value assigned to the dynamic first record identifier is associated with the record.

12. A system comprising:
  a memory storing a page definition for a network page including main content and injected content, the page definition comprising:
    a dynamic first record identifier for the network page, and
    a first page element including:
      an injected content identifier for the injected content, and
      an injected content version for the injected content; and
  one or more processors that execute specific computer-executable instructions to at least:
    in response to a request for a network page, generate the network page based at least in part on the page definition, wherein to generate the network page, the one or more processors execute the specific computer-executable instructions to at least:
      assign a value to the dynamic first record identifier;
      identify the first page element for the network page; and
      replace the first page element with injected content identified by the injected content identifier, wherein the injected content references a network address for the first page element for the network page and the value assigned to the dynamic first record identifier;
    wherein the network page, upon loading, executes the main content in a first execution context and the injected content in a second execution context, and
    wherein the injected content executed in the second execution context has limited access to the main content executed in the first execution context.

13. The system of claim 12, wherein to generate the network page, the one or more processors execute further specific computer-executable instructions to at least:
  receive, from a service directory, metadata for the first page element based at least in part on the first injected content identifier, wherein the metadata includes: (i) a first version identifier for the first page element, and (ii) a first network address for a first version of the first page element associated with the first version identifier; and
  determine that the first version identifier corresponds to the first injected content version.

14. The system of claim 12, wherein:
  the page definition for the network page further comprises a second page element including:
    a second injected content identifier, and
    a second injected content version, and
  to generate the network page, the one or more processors execute further specific computer-executable instructions to at least:
    receive, from a service directory, metadata for the second page element based at least in part on the second injected content identifier, wherein the metadata includes: (i) a first version identifier for the second page element, and (ii) first a network address for a first version of the second page element associated with the first version identifier;
    determine that the first version identifier does not correspond to the second injected content version; and
    replace the second page element with placeholder content.

15. The system of claim 12, wherein the one or more processors and a computing device associated with the network address for the first page element are located within a same network domain.

16. The system of claim 12, wherein the injected content is included within a frame of the network page so as to limit access by the injected content executed in the second context to the main content executed in the first execution context.

17. The system of claim 12, wherein access, by the injected content executed in the second execution context to the main content executed in the first execution context, is limited to a variable from the main content executed in the first execution context.

18. The system of claim 12, wherein to generate the network page, the one or more processors execute further specific computer-executable instructions to at least:
  store a network address in association with the network page;
  extract a request network address from a header field of the request for the network page;
  compare the request network address to the network address; and
  identify the first page element based at least partly on comparing the request network address to the network address.

19. The system of claim 12, wherein to generate the network page, the one or more processors execute further specific computer-executable instructions to at least:
  transmit, to a content delivery network server associated with a plurality of content servers, the injected content; and
  update metadata for the first page element to include an address of the content delivery network server.

20. The system of claim 12, wherein to generate the network page, the one or more processors execute further specific computer-executable instructions to at least:
  receive a request for a record; and
  identify the value assigned to the dynamic first record identifier, wherein the value is associated with the record.

* * * * *